(12) United States Patent
Barchers

(10) Patent No.: US 6,452,146 B1
(45) Date of Patent: Sep. 17, 2002

(54) ELECTRO-OPTICAL FIELD CONJUGATION SYSTEM

(75) Inventor: Jeffrey D. Barchers, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/682,146

(22) Filed: Jul. 26, 2001

(51) Int. Cl.$^7$ ................................................. G01J 1/20
(52) U.S. Cl. ..................................... 250/201.9; 250/216
(58) Field of Search ........................... 250/201.9, 201.3, 250/216; 359/10, 11, 16, 299, 300; 356/451, 450

(56) References Cited

U.S. PATENT DOCUMENTS 5,046,824 A * 9/1991 Pepper ..................... 250/201.9

OTHER PUBLICATIONS

Barchers, J.D. and Ellerbroek, B. L., "Improved compensation of turbulence induced amplitude and phase distortions by means of multiple near field phase adjustments," *Journal of the Optical Society of America A.*, 18, pp. 399–411, 2001. Month unknown.

Barchers, J. D., "Evaluation of the impact of finite resolution effects on scintillation compensation using two deformable mirrors," accepted for publication in the *Journal of the Optical Society of America A.*, 2001. Month unknown.

Barchers, J. D., "Application of the parallel generalized projection algorithm to the control of two finite resolution deformable mirrors for scintillation compensation," submitted for publication in the *Journal of the Optical Society of America A.*, 2001. Month unknown.

Barchers, J. D., "Increase in the compensated field of view in strong scintillation using two deformable mirrors," in *Beyond Conventional Adaptive Optics*, R. Ragazzonni, editor, 2001. (Month unknown).

Barchers, J. D., "Closed loop stable control of two deformable mirrors for compenation of amplitude and phase fluctuations," submitted for publication in the *Journal of the Optical Society of America A.*, 2001. Month unknown.

Barchers, J. D., "Convergence rates for iterative vector space projection methods for control of two deformable mirrors for compensation of both amplitude and phase fluctuations," submitted for publication in the *Journal of the Optical Society of America A.*, 2001. Month unknown.

Roggemann, M. C. and Lee, D. J., "A two deformable mirror concept for correcting scintillation effects in laser beam projection through the turbulent atmosphere," *Applied Optics* 37, pp. 4477–4485, 1998. Month unknown.

* cited by examiner

*Primary Examiner*—Que T. Le
(74) *Attorney, Agent, or Firm*—James M. Skorich; Kenneth E. Callahan

(57) ABSTRACT

A method for real-time, robust, stable closed-loop control of two phase correction devices to compensate for both amplitude and phase fluctuations induced by light passing through a turbulent medium. Two phase correction devices, in different conjugate planes, are controlled to minimize the difference in phase of the input beam corrupted by turbulence and an ideal reference beam.

4 Claims, 8 Drawing Sheets

ELECTRO-OPTICAL FIELD CONJUGATION SYSTEM

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

This invention relates to the control of adaptive optical elements, and more particularly to a method for the compensation of amplitude and phase fluctuations that result from the propagation of light through an extended turbulent medium.

Deformable mirrors have been used in recent years in astronomical telescopes to compensate for distortions of incident light caused by atmospheric turbulence. While the atmosphere distorts the wave front in both amplitude and phase, at the high angles that astronomical telescopes normally operate (within 60° of zenith), only the phase fluctuations are significant. Both phase and amplitude fluctuations, however, are significant for lower elevation angles or for extended horizontal paths.

Conventional adaptive optical (AO) astronomical systems in use today employ only a single-phase correction device (nominally a conventional flexible thin facesheet deformable mirror) to compensate for the random phase fluctuations induced by propagation through a turbulent medium. This is partly due to the operation of telescopes at high elevation angles. It is also due to the fact that there currently exists no practical system to compensate for both phase and amplitude fluctuations. The use of a single-phase correction device imposes two fundamental limitations. First, the compensated field of view is limited to just slightly larger than the isoplanatic angle, $\Theta_0$. The compensated field of view is the angular extent over which the imaging performance of a telescope system is acceptable. This is typically defined to be the angle over which the Strehl ratio (a measure of imaging performance ranging from 0 to 1) is greater than ½ that achieved by a single deformable mirror adaptive optical system along the optical axis. The isoplanatic angle is a theoretical approximation of the compensated field of view associated with a single deformable mirror adaptive optical system. Atmospheric turbulence can limit this value to be quite small leading to poor imaging performance everywhere except a very narrow cone angle. Second, when light propagates through extended turbulence, whether due to a long horizontal path propagation or due to imaging or propagation at low elevation angles, the amplitude as well as phase fluctuations begin to significantly degrade the performance of an imaging or propagation system.

Past research has focused on mitigating each of these two major limitations following two fairly distinct paths. When the amplitude fluctuations are very weak and the geometric optics approximation is valid, the compensated field of view can be increased by use of multiple wavefront sensing beacons to form a tomographic estimate of the phase in the atmosphere. Then, the optimal commands to be applied to an arbitrary number of phase correction devices can be determined to maximize the compensated field of view. The advantages offered by this approach are that it can be implemented as a linear system, and it is a natural extension of the current state of the art. This approach is referred to as the classical multi-conjugate adaptive optics technique. Although this approach is quite mature and work is underway worldwide in the astronomy community to implement multi-conjugate adaptive optical systems, due to the use of the geometrical optics approximation inherent in its development, this approach only addressed the first limitation (the compensated field of view).

Research concerning the second limitation (propagation through extended turbulence leading to significant amplitude fluctuations) took a significantly different approach due to the fact that exactly when scintillation becomes such that it is worth attempting to compensate, the geometrical optics approximation is no longer valid. The need to incorporate wave optical propagation physics into the control algorithms led to the use of iterative vector space projection algorithms to determine the phase commands to be applied to the two deformable mirrors. The research in this area initially considered a phase correction device conjugate to the pupil and to the far field. More recently, a further improvement was found by placing the second phase correction device conjugate to a finite range. (Barchers, J. D. and B. L. Ellerbroek, Improved compensation of turbulence-induced amplitude and phase distortions by means of multiple near-field phase adjustments, Vol. 18, No. 2, *J. Opt. Soc. Am. A*, February 2001.) This early work utilized infinite resolution phase correction devices and wavefront sensors. The control algorithms were improved to handle finite resolution phase correction devices and wavefront sensors by augmenting spatial filtering techniques into the optimization process to prevent high spatial frequency propagation effects from corrupting the control commands. (Barchers, J. D., Evaluation of the impact of finite resolution effects on scintillation compensation using two deformable mirrors, accepted for publication in *J. Opt. Soc. Am. A*, 2001, and Barchers, J. D., Application of the parallel generalized projection algorithm to the control of two finite resolution deformable mirrors for scintillation compensation, accepted for publication in *J. Opt. Soc. Am. A*, 2001) Even more recently, the first control algorithm designed to simultaneously increase the compensated field of view and to compensate for amplitude as well as phase fluctuations was presented. (Barchers, J. D. and B. L. Ellerbroek, Increase in the compensated field of view in strong scintillation by use of two deformable mirrors, in *Beyond Conventional Adaptive Optics*, R. Ragazonni, Editor, May 2001.) While all of this work represents an important series of preliminary steps toward implementation of a multi-conjugate adaptive optical system to compensate for amplitude and phase fluctuations (and possibly even to increase the compensated field of view), there are two major difficulties that need to be overcome prior to proceeding towards implementation. The first limitation is that the algorithms that were studied for application in the strong scintillation regime are iterative and generally require 40–60 iterations to converge. Each individual iteration requires calculations comparable to a conventional adaptive optical system, however, the sum total represents a great increase in the required number of calculations over the current state of the art. This increase in the required computation time has served as an excuse to largely treat the use of multiple phase correction devices for scintillation compensation as an academic exercise: interesting but not very practical.

The second limitation of the iterative approaches is that their formulation requires an open-loop approach. The input wavefront corrupted by turbulence must be measured and the control commands then generated by software emulation of propagation physics. Such an approach requires nearly perfect calibration of the phase correction devices and wavefront sensors. It is also limited by the resolution at which the propagation physics can be emulated in software.

Neither an iterative calculation requiring many numerical calculations to be performed nor an open loop approach is desirable. Development of a sufficiently high-speed software architecture suitable for iterative calculations would be both costly and time consuming. An open loop approach is not desirable due to the fact that any uncertainties in the system (uncertain gains, misalignments, etc.) lead directly to reduced compensation whereas in a closed loop approach, some performance robustness to model uncertainties is preserved.

Accordingly, a closed-loop, or null-seeking, approach would be a significant improvement over the current open loop, iterative approaches as this would significantly reduce system complexity and greatly improve performance robustness.

SUMMARY OF INVENTION

In a preferred embodiment, the invention provides a means for controlling two phase correction devices that compensate for both amplitude and phase fluctuations resulting from propagation through a turbulent medium. By proper selection of a residual error signal, the technique implements open loop, iterative algorithms in a closed-loop stable fashion. In general, four wavefront sensing measurements are required: a measurement of the incoming beam at the plane of both phase correction devices and a measurement of the outgoing beam (either a real or artificially generated reference outgoing beam) at the plane of both phase correction devices. An embodiment that requires only two wavefront sensing measurements is possible if the wavefront sensing beacon is temporally coherent and is either a point source or, if an extended source, is spatially coherent. In either embodiment, the control loops associated with each phase correction device are decoupled. Furthermore, the required number of electronic calculations to be performed per phase correction device is no greater than that required for current conventional adaptive optical systems.

Other aspects and advantages of the present invention will become apparent from the following detailed description, taken in conjunction with the accompanying drawing, illustrating by way of example the principles of the invention.

DETAILED DESCRIPTION

1. Overview

Figure 1:
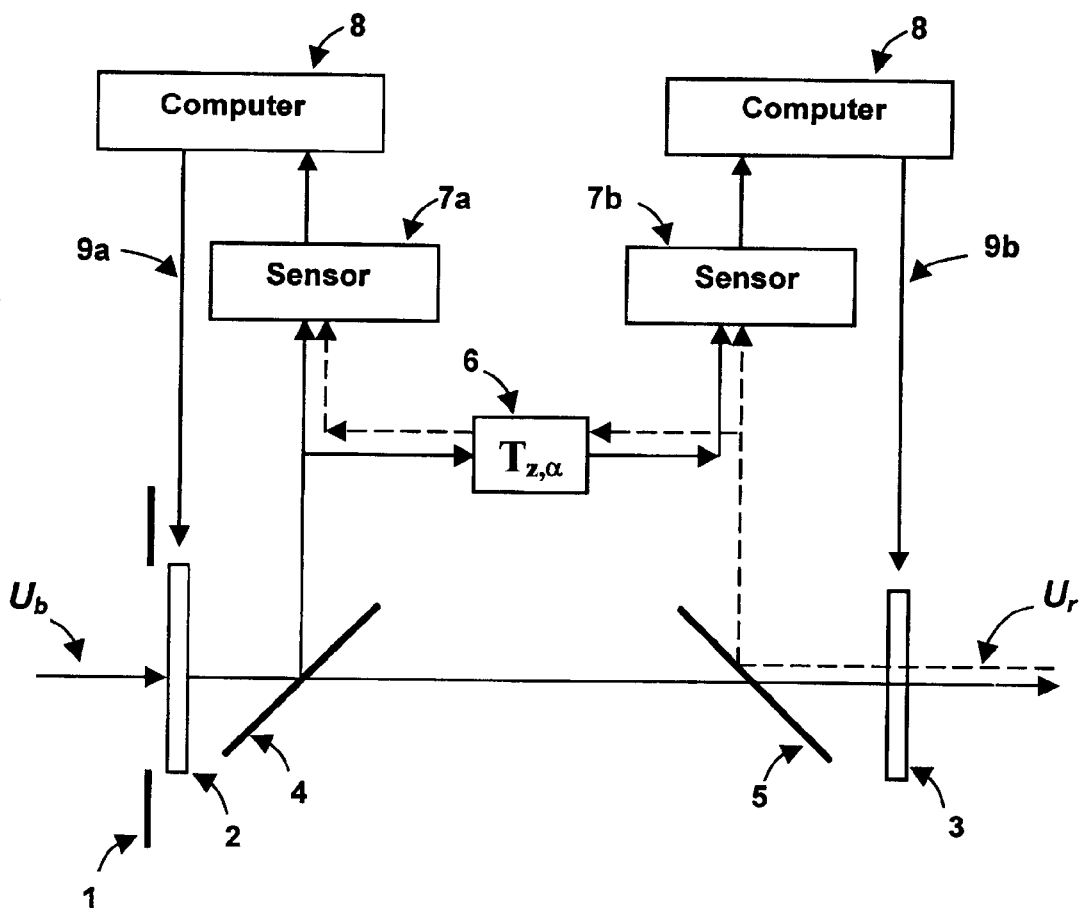
FIG. 1 depicts a generic framework for the Electro-Optical Field Conjugation System (EOFCS).

The present invention is a new approach to the problem of controlling a two phase-correction device system to compensate for both amplitude and phase fluctuations resulting from propagation through a turbulent medium.

Previous techniques used iterative algorithms to determine the phase commands and open-loop wavefront sensing and correction. These two difficulties are circumvented by means of the Electro-Optical Field Conjugation System (EOFCS). It provides closed-loop stable control of two phase-correction devices via an electro-optical computer for full wave beam control.

Algorithms previously applied to this problem required many iterations to converge. However, very few iterations are required to perform an update to the control commands to the phase correction devices if the complex field to be corrected at one measurement period is closely related to the complex field in the next measurement period. Fortunately, this is generally the case. By initializing the iterative algorithm with the previous values for the control command, the number of iterations needed to converge is significantly reduced. In fact, if the sample frequency is sufficiently greater than the Greenwood frequency (a measure of the required bandwidth to compensate the atmospheric turbulence), then only a single iteration is required at each measurement period to obtain good compensation.

A software architecture to numerically perform a single iteration at each measurement period could be developed. However, with the EOFCS, there are additional features that allow implementation in a closed-loop fashion and in turn maximize stability and performance robustness. Another feature of the EOFCS is recognition of the proper error signal to be provided to the optimization algorithm. The proper error signal is the phase difference, at the plane of each phase-correction device, between the input beacon field and an outgoing laser beam field. It should be noted that in an energy projection application, the outgoing laser beam is truly a beam that is available for sensing. However, in an imaging application, the outgoing laser beam is typically taken to be a reference wavefront that the input beam should match in order to maximize the imaging performance. In the EOFCS, some measurement of the phase difference between the incoming beacon field and the outgoing laser beam field (whether a true laser beam to be pre-compensated for the effects of turbulence or an artificially generated reference beam) is obtained at the plane of each phase correction device. By properly selecting the measurements obtained, a null-seeking, closed loop stable approach for beam control is obtained. Rather than performing the propagation between the planes of the phase correction devices numerically (as in previous research), the propagation between correction planes is performed in an analog fashion (optically). By proper selection of the error signal, all of the uncertainties inherent in the control system are captured, including all of the relevant effects associated with wave optical propagation between the two planes.

The means for obtaining the error signal is application specific, however, an ideal configuration applicable for use with a point source is described in detail in this specification. Also described are several other methods for obtaining the required measurements. Any method for obtaining a measurement of the phase difference between the two beams will suffice, however. The method itself is not critical, rather the important detail is the recognition of the fact that simultaneous minimization of the phase error between the beams in each plane also leads to compensation for differences in the amplitude between the two beams, correspondingly leading to an increase in performance. This works because the EOFCS is a relaxed implementation of the open loop iterative algorithms previously researched. Appendix A contains a brief discussion of the mathematical principle on which the EOFCS is based. For a more detailed discussion of the properties of the EOFCS the reader may consult Barchers, J. D., "Closed loop stable control of two deformable mirrors for compensation of both amplitude and phase fluctuations," submitted for publication in *J. Opt. Soc. Am. A*, 2001.

By virtue of the fact that the propagation between conjugate planes is performed optically, rather than numerically, the requirement on development of an advanced software architecture has been eliminated. Rather, the electronics of the EOFCS require only minor modifications to existing software architectures, depending on the sensor(s) selected, to obtain measurements of the phase difference between the incoming and outgoing beams at the two correction planes.

A complete description of the EOFCS follows. First in section 2, a description of the problem is provided. Section 3 provides a generic framework for the EOFCS with black boxes for arbitrary wavefront sensors. The implementation details of an ideal configuration for use with a point source wavefront sensing beacon are described in section 4. Several example simulation results that indicate promising performance improvements are presented in Section 5. Section 6 provides recommendations for wavefront sensing techniques applicable when a coherent source for wavefront sensing is unavailable. Section 7 describes a means for incorporating multiple wavefront sensing beacons into the EOFCS architecture to simultaneously increase the compensated field of view and compensate for amplitude fluctuations.

2. Problem Statement

The objective of a control algorithm for a two phase-correction device system is to determine phase commands for the two phase-correction devices that maximize the on-axis Strehl ratio. The properly normalized Strehl ratio, S, is given by, $$S = \frac{\left|\int d\bar{r}_1 U_b(\bar{r}_1)\exp[i\phi_1(\bar{r}_1)]T_z\{U_r^*(\bar{r}_2)\exp[-i\phi_2(\bar{r}_2)]\}\right|^2}{\left|\int d\bar{r}_1 |U_b(\bar{r}_1)|^2\right|\left|\int d\bar{r}_2 |U_r(\bar{r}_2)|^2\right|} \quad (1)$$

where $U_b$ is the complex field describing the beacon wavefront, $\phi_1$ and $\phi_2$ are the phase values applied to each phase correction device, $U_r$ is the reference wavefront (the desired form of the compensated wavefront to achieve perfect compensation), and $T_z$ is the unitary operator describing propagation through free space. In an imaging system, the normalized Strehl ratio above is a measure of the imaging resolution. For an imaging application, the reference wavefront is assigned to be the near field propagation of an unaberrated pupil function, i.e., $U_r=T_z(M_0)$ where $M_0$ is the unaberrated pupil function. By making this definition, the ideal phase corrections applied in the two conjugate planes will convert the function $U_b$ to the function $U_r=T_z(M_0)$, which, when propagated back to the pupil plane and imaged will result in diffraction limited image quality, i.e., unity Strehl.

As an example of an imaging application, consider that an astronomer wishes to image a very dim galaxy, so dim that it does not provide sufficient light for wavefront sensing. In this case, one may use an artificially generated laser guide star which consists of either light reflected (via Rayleigh scattering) off of the atmosphere at an altitude of approximately 10–15 km, or stimulated back-scatter off of the mesospheric sodium layer at an altitude of approximately 90 km, to generate light to be used for wavefront sensing. The light from the artificial guide star is temporally incoherent. If the beacon is pointed in the direction of the dim galaxy of interest, then the light from the artificial guide star experiences nearly the same phase distortions as the dim galaxy. Thus, by correcting the light measured from the artificial guide star, an improved image of the dim galaxy is also obtained. There are many other practical problems associated with the use of laser guide stars that are not discussed here but are well known in the adaptive optics community. A more ideal source for a wavefront sensing beacon, that is not in use today due to extreme expense and difficulty in control, would be a space based laser guide star mounted on a satellite in earth orbit. In addition to dim object imaging, such space based laser guide stars have been proposed for solar astronomy. While laser guide stars could be used for the implementation of the EOFCS described in section 3, they would not be suitable for the ideal configuration described in section 4. However, a space based laser guide star would be suitable for the ideal configuration described in section 4. Another application that is suitable for either implementation is the search for planets in nearby solar systems. In this case a bright reference source (i.e. a nearby star) is available for use as a point reference source, and either implementation of the EOFCS could be used. The examples of dim deep space object imaging and planet searches shall be used throughout the text to provide practical examples for use of the EOFCS.

In addition to imaging applications, energy projection offers another use for the EOFCS. In an energy projection system, the reference function $U_r$ is taken to be the wavefront of the outgoing laser beam. In an energy projection application, via the extended Huygens-Fresnel principle the Strehl ratio is proportional to the far field on-axis intensity of the laser beam after propagation back through the turbulent medium. Of course, this is not exactly true due to the use of a finite aperture, however, given the available information, it serves as the best possible approximation. In the case of energy projection, the ideal phase corrections will lead to the laser beam profile being modified to exactly match that of the measured input field, $U_b$.

3. Generic Framework for the EOFCS

The concept of the EOFCS is to measure and correct the phase difference between two beams (that are to be made proportional to one another) at two conjugate planes. A schematic depiction of the means to accomplish this is shown in FIG. 1. An input wavefront sensing beacon field which corresponds to $U_b$ in Eq. 1 is received at the telescope aperture 1, whereupon it is corrected by the first phase correction device 2. After propagation to the plane of the second phase correction device 3, which can be conjugate to either some altitude below or above the telescope pupil, a second correction is applied. Nominally at this point, full wave compensation to force the field of the input beam to match that of the reference beam ($U_r$ in Eq. 1) is achieved. In order to determine the commands to be applied to each mirror, beam splitters 4, 5 are used to split off the input and reference beams after correction by the first and second phase correction devices, respectively. At this point, the input beam after correction by the first phase correction device is relayed to the plane of the second phase correction device by the optics equivalent to the operator, $T_{z,\alpha}6$, which accomplishes simultaneously spatial filtering and wave optical propagation (described in detail below). In addition, the outgoing beam after correction by the second phase correction device is relayed, via $T_{z,\alpha}$, to the plane of the first phase correction device. At this point, some wavefront sensing technique 7 is used to measure the phase difference between the input and reference beams. Finally, a digital computer Stakes the measurements from the wavefront sensors, temporally filters the error signals, and applies the result 9 to the phase correction devices. Two similar digital computers 8 operating independently or a single computer could be used.

The wavefront-sensing problem can be approached in two general fashions. If the input beam can be made to interfere with the reference beam (i.e. if the two beams are coherent), then only a pair of sensors is required to determine the phase difference between the two beams. This is the ideal configuration that is described in detail in Section 4. However, if the input beam is not coherent with the reference beam, then, in general, four separate measurements (one of each beam at each plane) must be made. In this case, then any wavefront sensing and reconstruction approach appropriate to the application and the severity of the turbulence can be applied to each beam.

Imaging of dim galaxies using a laser guide star is an example application that has an incoherent reference source. Thus a measurement of the input beacon beam would be made at the plane of each deformable mirror using some sort of wavefront sensor and reconstruction algorithm suitable for measuring the phase experienced by a laser guide star. The reference beam would simply be a laser source on the bench that, ideally, has a similar bandwidth as the laser guide star and whose nominal beam profile is defined so that perfect imaging of the laser guide star is obtained when using the EOFCS. As for the beacon beam, the phase of the reference beam would be measured at the plane of each of the deformable mirrors.

It should be noted that the control loops on each of the two phase-correction devices are completely decoupled from one another. This particular feature greatly reduces the system complexity and allows the hardware and software architectures required for implementation to be very similar to those in use today.

Figure 2:
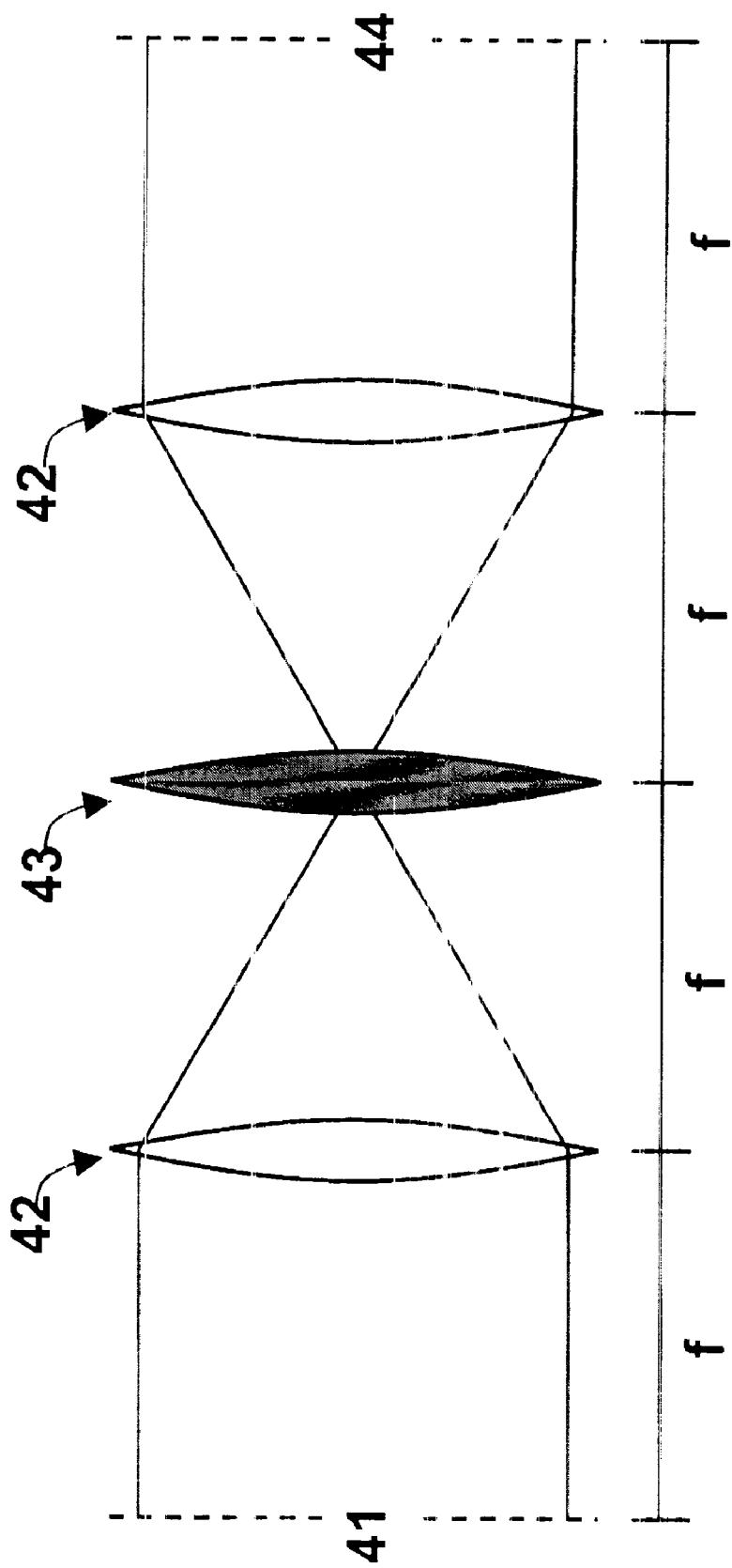
FIG. 2 illustrates a propagation and spatial filtering operator.

An idealized optical description of the spatial filtering and propagation operator, $T_{z,\alpha}$, is shown in FIG. 2. It was found previously that when utilizing finite resolution phase correction devices and wavefront sensors, this operator had to be included in the optimization process in order to obtain a good performance improvement. $T_{z,\alpha}$ is defined mathematically as, $$T_{s,\alpha}[\cdot] = F^{-1}\left\{F[\cdot]\exp\left[i\pi\lambda z\kappa^2 - \left(\frac{\pi\alpha}{2}\right)^2\kappa^2\right]\right\} \quad (2)$$

where F is the two dimensional Fourier transform operator, λ is the wavelength of propagation, z is the distance of propagation, and K is the spatial frequency variable of integration. The quantity, α, represents the 1/e width of the Gaussian filter represented in the plane of the field on which $T_{z,\alpha}$ operates. This equation can be implemented in an optical computer via the standard 4-f system shown in FIG. 2, where f is the focal length of the spherical lenses 42. At 41 the wavefront, U, is collimated. The wavefront is brought to focus at 43 where a spherical field lens is placed so that after re-collimating the wavefront at 44, the wavefront is conjugate to a finite range, z. In addition, at 43, a Gaussian spatial filter is applied. Rather than using a Gaussian spatial filter, a simple top-hat (i.e., iris) spatial filter could be used as well to simplify practical implementation. Also note that there is no requirement that this exact optical implementation be used in practice. There are many alternate implementations that could be used, depending on the application. As the details of optical implementation of this system are irrelevant, the subject is not discussed further. FIG. 2 is primarily included for illustrative purposes.

4. The Ideal Configuration of the EOFCS for Full Wave Beam Control

Having provided a general description of the EOFCS, a specific configuration that requires only two wavefront sensors is described in this section. A local reference beacon is generated by spatial filtering of the compensated input beam. In this manner, the phase difference measurements between the incoming and outgoing beams can be obtained by interfering the incoming and outgoing beams, rather than by direct measurement of the phase on each beam and numerically calculating the phase difference between the two beams.

This approach can likely only be used when certain types of wavefront sensing beacons are available. If the beacon is a point source, then this approach can be used. However, if the beacon is temporally incoherent, as would be the case in a planet search on a nearby star, then very tight path length requirements must be met. If the beacon is temporally coherent (reasonably long coherence length), as would be the case for using a space based laser guide star for dim object imaging or solar astronomy, then optical amplification of the reference beam may be possible (depending on the wavelength of interest and the existing technology in optical amplification). If the beacon is not a point source then it must be spatially coherent in order for this approach to be feasible. Despite these limitations, the approach still has wide application and provides insight into the most effective way to implement the EOFCS for other applications.

Figure 3:
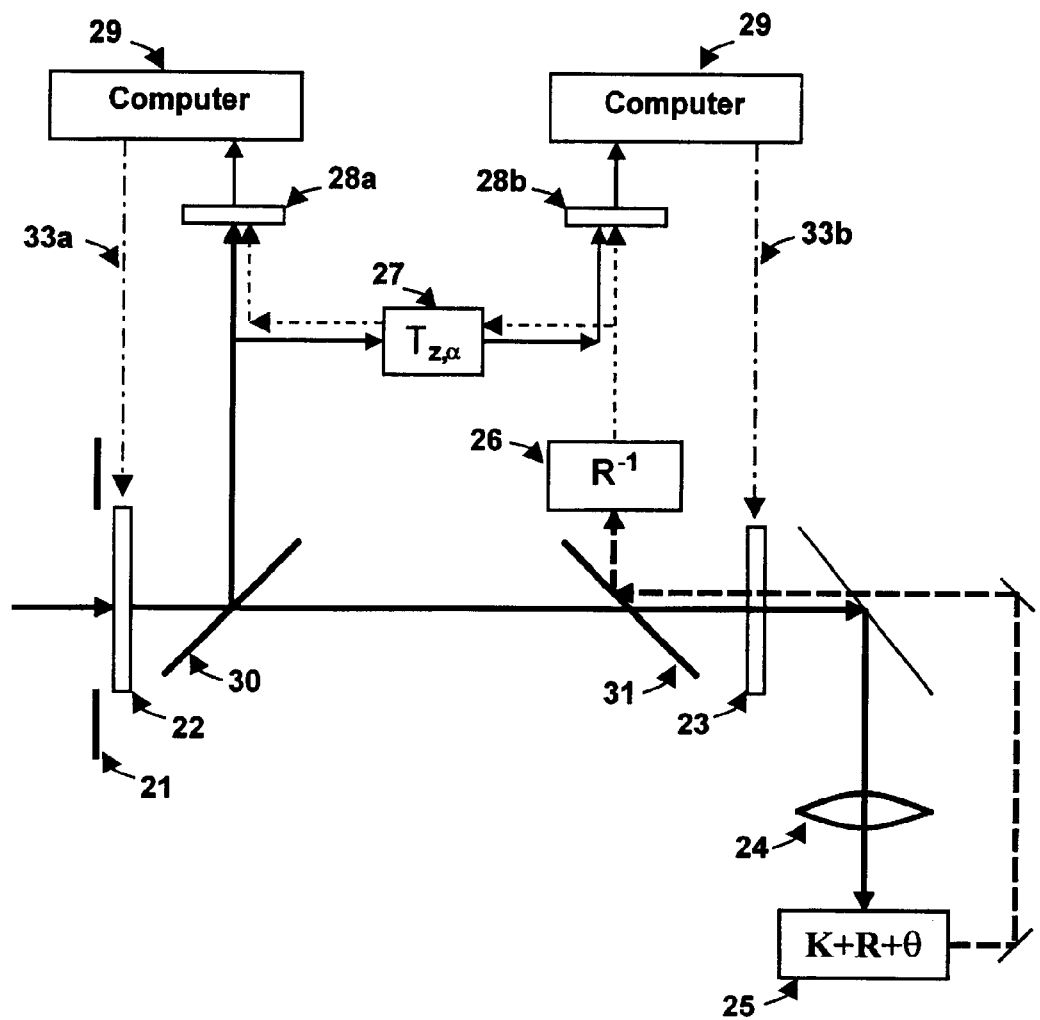
FIG. 3 is a configuration schematic for one version of the EOFCS.

FIG. 3 illustrates this ideal configuration. This is not a detailed optical design, rather it represents a notional block diagram of a design that could be implemented. The incoming beam $U_b$ passes through the telescope aperture 21 and the phase correction device 22, which is nominally conjugate to the pupil, and applies the first phase correction. Next, the beam passes through a beamsplitter 30 and a polarizing beamsplitter 37 before reaching the second phase correction device 23, which is conjugate to a finite range, z. The phrase conjugate to a range, z indicates that the phase correction device is placed at a location on the optical bench that is equivalent to distance, z, in the output space of the telescope.

Next, the beam $U_b$ is focused by lens 24 onto a pinhole (or equivalent optical device), whereupon the beam is amplified (if possible), expanded, a phase shift, ≦, is applied, and the polarization is arranged to be orthogonal to the polarization of the input beam along the outgoing path. Block 25 represents the spatial filtering, amplification (if the input beam is coherent laser light), beam expansion, phase shifting and polarization rotation. Thus, the input beam $U_b$ is transformed, via compensation and spatial filtering, into a reference beam $U_r$. The input beam $U_b$ will be compared to the reference beam U and modified in order to obtain a perfect match.

The reference beam is then propagated back through the second phase correction device 23. After reflection off of the polarizing beamsplitter 31, the polarization is rotated by 26 to match that of the incoming beam. At this point, the role played by the spatial filtering and propagation operator, $T_{z,\alpha}$, 27 is described. This operator is the 4-f optical system described in FIG. 2. It is a relay optic designed to propagate and spatially filter (nominally a Gaussian spatial filter) the reference and input beams between the conjugate planes of the two phase-correction devices. The reference beam corrected by the second phase correction device is interfered with the input beam corrected by the first phase correction device on either side of the spatial filtering and propagation operator. These two interference patterns are relayed to two separate CCD arrays 28a, 28b where the intensities are measured. By using four temporally separated measurements with phase shifts of 0, $\pi/2$, $\pi$, and $3\pi/2$ applied to the reference beam and properly combining the intensities, the average over the extent of a subaperture of the reference beam conjugated by the input beam is measured. This measurement serves as the phase error signal, which is temporally filtered by a parallel computing system 29a, 29b. The temporally filtered output of the computer is applied to the phase correction device, thereby closing the loop.

There are several issues that should be discussed pertaining to implementation that should be described in greater detail. These are: (a) the method to obtain phase error measurements; (b) the recommended procedure for temporal filtering and phase unwrapping; (c) the procedure for adjusting the value of the spatial filter waist, $\alpha$; (d) a brief comment on the coherence length requirements of this system; (e) the ideal means for use of this system for energy projection applications; and (f) an exceptional case that does not require generation of a local reference but still allows the use of only two wavefront sensing measurements.

(a) The first issue is the means by which the four different intensity patterns associated with the different phase shifts are converted into an estimate of the field of interest. Although this is a description of a well-known procedure, it is included here for completeness. Given two complex fields $U_1$ and $U_2$, the intensity produced by the interferogram for a phase shift, $\Theta$, applied to $U_2$, is given by, $$I(\theta) = |U_1 + U_2 \exp(i\theta)|^2 \quad (3)$$
$$= A_1^2 + A_2^2 + A_1 A_2 \exp[i(\phi_1 - \phi_2 - \theta)] + A_1 A_2 \exp[-i(\phi_1 - \phi_2 - \theta)]$$

Given intensities produced by values of $\Theta$ of 0, $\pi/2$, $\pi$, and $3\pi/2$, the real and imaginary parts of the quantity $U_2^* U_1$ can be formed by taking appropriate differences of the values of the intensities, $$\mathrm{Re}(U_2^* U_1) = \frac{1}{4}[I(0) - I(\pi)] \quad (4)$$

$$\mathrm{Im}(U_2^* U_1) = \frac{1}{4}[I(\pi/2) - I(3\pi/2)] \quad (5)$$

Using this procedure, the measurements produced are the average over the extent of a subaperture (i.e. a pixel on a CCD camera) of the quantity $U_2^* U_1$, whose argument is the best possible measurement of the phase difference between the two beams. The intensities associated with the different values of the phase shift can be obtained either spatially or temporally. The choice of using spatial or temporal filtering is dependent on the application. Generally, given a fixed amount of CCD area, if the sample frequency of the system is reasonably high relative to the expected temporal content of the disturbance, then the increase in spatial resolution and reduction in system complexity obtained by using temporal phase shifting outweighs the increased bandwidth obtained by using spatial phase shifting.

The second issue to be described is the means to temporally filter the measurements obtained from each sensor and to unwrap the phase values in a reasonable fashion for application to a finite resolution phase correction device. The temporal filtering is slightly different from conventional temporal filtering because the quantities of interest are the complex field associated with the phase correction device, rather than strictly the phase associated with the phase correction device. The update to a phase command associated with the j-th correction device is given by, $$\exp[i\phi_j(k+1)] = \exp[i\phi_j(k)]\{\exp[i\alpha\epsilon_j(k)]\} \quad (6)$$

where $\epsilon_j$ is the phase error between the input and reference beam observed at the plane of the j-th correction device. This control algorithm is similar to a proportional integral controller, where a is the gain. Assuming that a has been selected to ensure loop stability (approximating the control loop as a linear system with a proportional integral controller), it is easy to see that when the loop is closed, the control law drives the residual error to zero.

If the phase correction device is a spatial light modulator, or a segmented deformable mirror, or any other device that can apply phase commands in the range [0,2$\pi$], then no further processing is required and the phase commands obtained from Eq. 6 can be applied to the phase correction device. However, if a conventional, continuous facesheet deformable mirror is used (or if one is interested in maximizing the wavelength band over which compensation is achieved), then the phase commands must be unwrapped as much as possible. This is accomplished in a fairly straightforward set of steps, described by the following, $$\phi_{j,unwrap} = LS(\phi_j) + \arg\{\exp(\phi_j)\exp[-LS(\phi_j)]\} \quad (7)$$

where $$LS(\phi_j) = (G^T G)^{-1} G^T PV(G\phi_j), \quad (8)$$

where PV is the principal value operator and G is the discrete representation of the gradient operator in the shearing geometry. While this phase unwrapping approach is not expected to be optimal, it is not unreasonable. Other, more effective, phase unwrapping approaches exist and may be appropriate to use. However, it is expected that little additional performance will be gained by a better phase unwrapping.

These two functions can be performed in either order, however, it is recommended that the filtering be performed first, followed by the phase unwrapping.

(c) Adjusting the waist of the Gaussian spatial filter. It was shown that for open loop control, good performance was obtained by initially using a large value of $\alpha$, the spatial filter 1/e width in the pupil plane, letting the iterative algorithm converge, and then reducing the value of $\alpha$, letting the algorithm converge again, and so on until a pre-determined cutoff value for $\alpha$ is reached. The optimal termination point was $\alpha = /$, where $/$ is the subaperture side length. Five logarithmically spaced values for $\alpha$ were found to yield good performance. This same procedure is used in the closed loop system. Switching between spatial filters is probably best accomplished by means of a high speed filter wheel. A switch from one spatial filter to the next is commanded when the Strehl ratio (measured on some auxiliary detector) achieves a steady state, or when 15 measurement periods have passed since the previous change in the filter. Once the final filter is reached, no further changes are necessary. It is only necessary to use the large value for $\alpha$ to initially allow the control loop to close, then once $\alpha = /$ has been reached, no further changes are required.

(d) Coherence requirements imposed by this system. In order to measure the phase error between the input and reference beam, the fringe visibility must be high.

Thus, either very tight path length tolerances must be met and/or the coherence length of the input light must be large. If one is using coherent laser light as the input beam, then, at some wavelengths, it is currently possible to optically amplify the reference beam to increase the signal to noise ratio. In this case, then the pinhole filter in 25 would be replaced by an amplification system.

(e) Energy projection system. In general, the ideal measurement in an energy projection system would be the phase error between the outgoing laser beam and the input sensing beam. It is not generally possible to obtain this measurement using the interferometric procedure described in this section due to the fact that unless the outgoing laser beam and the input sensing beam are coherent, the beams will not interfere. This is the reason for the approach taken in this section (generate a local reference that approximates the outgoing laser beam and interfere it with the input sensing beam). If the outgoing laser beam quality is very good, then this approach is likely to be satisfactory. However, a better approach would be to make the outgoing laser beam an amplified version of the local reference obtained by spatial filtering of the input wavefront-sensing beam. All practical considerations aside (i.e., generation of sufficient amplification), this approach could provide the ideal phase error measurements of interest.

(f) Exceptional case. Although this configuration has been described assuming that a local reference wavefront must be generated so that the phase error between the two beams can be obtained by interference of the two beams, there is one exceptional case in which the measurements can still be obtained via interference, thus requiring only two wavefront sensing measurements. If the incoming and outgoing beams are at the same wavelength, and both have very long coherence lengths, then they can be interfered and will form measurable fringes. The required coherence length is very long, but may be possible with current technology, and will most certainly be feasible in the future. The required coherence length is determined by the sample period of the wavefront sensing measurements, i.e., the laser beams must be coherent for a length of time sufficiently greater than a sample period. For example, for a 1-msec integration period, the coherence length must be greater than 300 km. In order to maximize visibility, it would be preferable to use longer coherence lengths, or shorter integration periods. This approach would provide an even more efficient beam control solution, as it eliminates the need to generate a stable local reference. One concern in such an approach is that the correction system will fight to also correct the temporal variations in the average phase delay between the two beams often referred to as the piston error (the average phase). As piston error has no effect on performance, this can be avoided by removing the piston error from the mirror commands and thus not followed by the correction system.

5. Example Simulation Results for the Ideal Configuration

A large number of wave optical simulations have been performed to evaluate the performance of the EOFCS. Several examples are provided here indicating that, in fact, the EOFCS, in the proposed ideal configuration achieves stable compensation superior to that over conventional adaptive optical systems in use today. Standard wave optical simulations were performed. The ratio of the subaperture diameter to the Fried coherence length, $r_0$, (a measure of the spatial coherence of light propagated through a turbulent medium) was fixed to equal ½. Several values of the Rytov parameter (a measure of the amount of scintillation induced by propagation through a turbulent medium) were selected: 0.2, 0.4, and 0.8. At a Rytov number of 0.2, the performance of conventional adaptive optical systems begins to degrade severely due to the presence of branch points in the phase function and amplitude fluctuations. Conventional continuous facesheet deformable mirrors were used. The value of the ratio of the Greenwood frequency, $f_G$, (a measure of the time rate of change of the phase fluctuations induced by propagation through a turbulent medium), to the error rejection function bandwidth, $f_{3dB}$, was varied from 0.1 to 1.0. The application is to convert an outgoing Gaussian laser beam to match the input wavefront.

Figure 4:
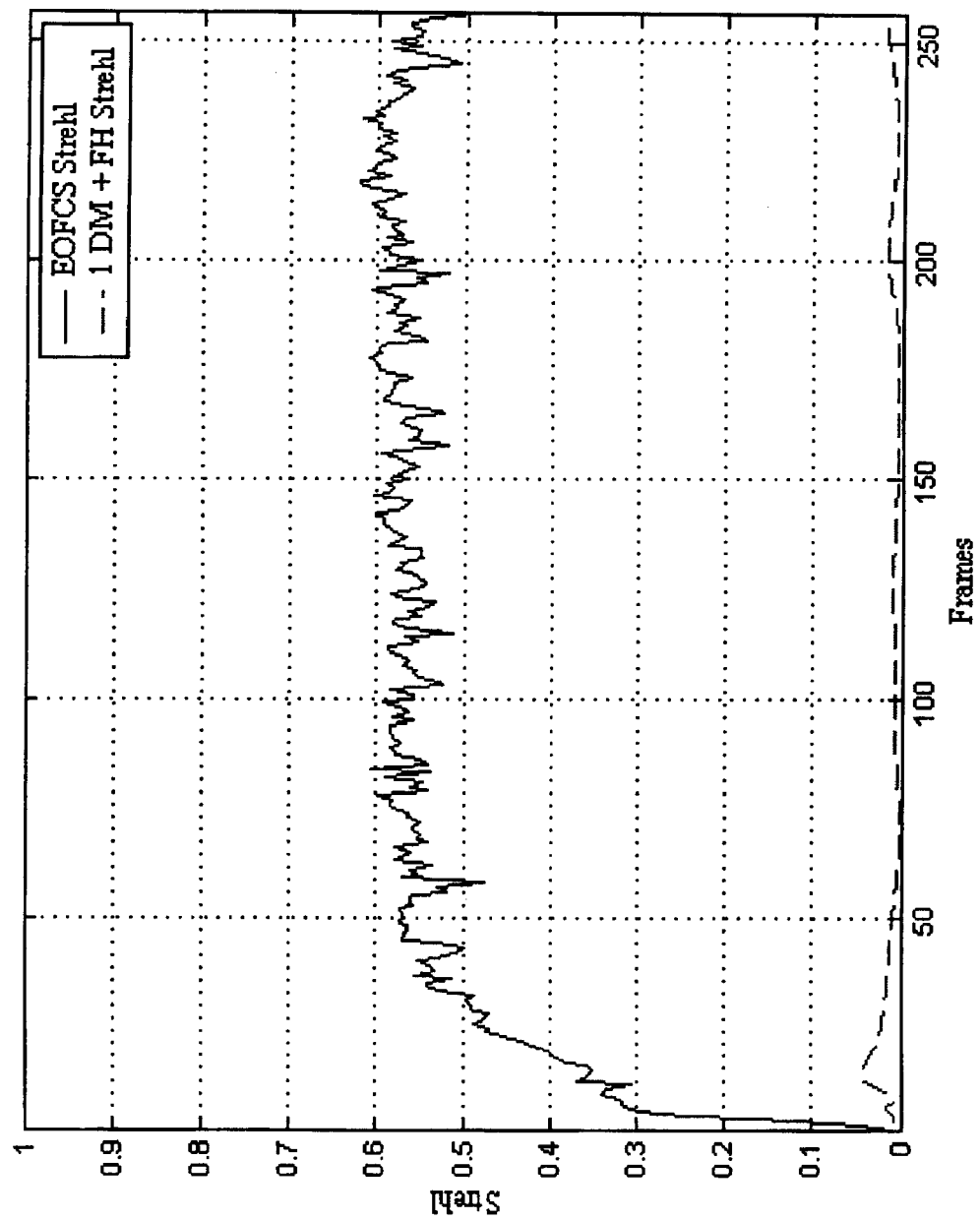
FIG. 4 presents a comparison of the performance of the EOFCS to a conventional AO system in a stressing turbulence condition with the ratio $f_G/f_{3dB}=0.1$.
Figure 5:
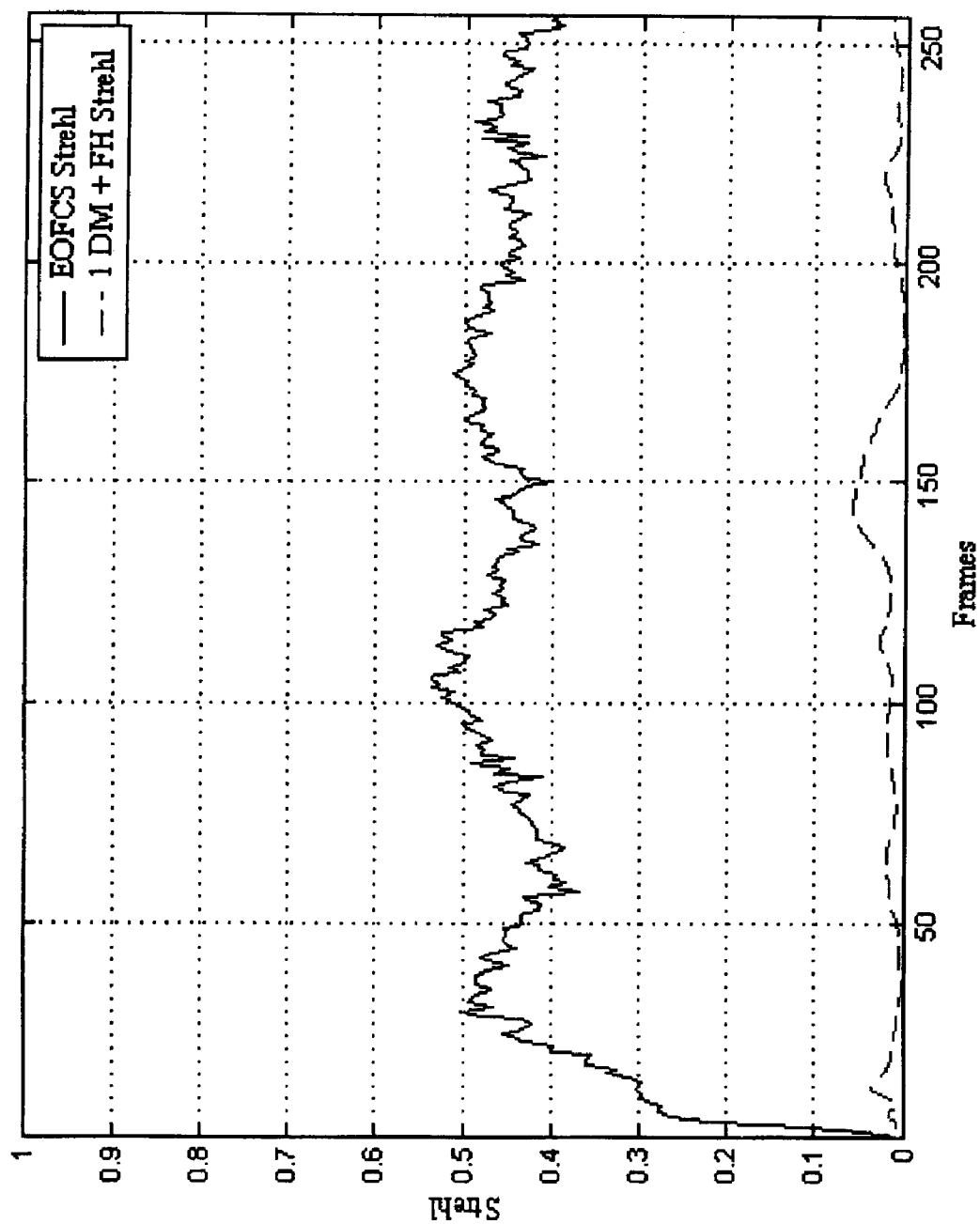
FIG. 5 presents a comparison of the performance of the EOFCS to a conventional AO system in a stressing turbulence condition with the ratio $f_G/f_{3dB}=0.5$.

Two example results are shown in FIGS. 4 and 5. The Rytov number equals 0.8, representing an extremely difficult beam control case. The ratio $f_G/f_{3dB}$ is set to equal 0.1 and 0.5 in FIGS. 4 and 5, respectively. The EOFCS exhibits very good compensation and the performance is stable. The performance of the EOFCS is vastly superior to that of conventional AO systems in use today.

Figure 6:
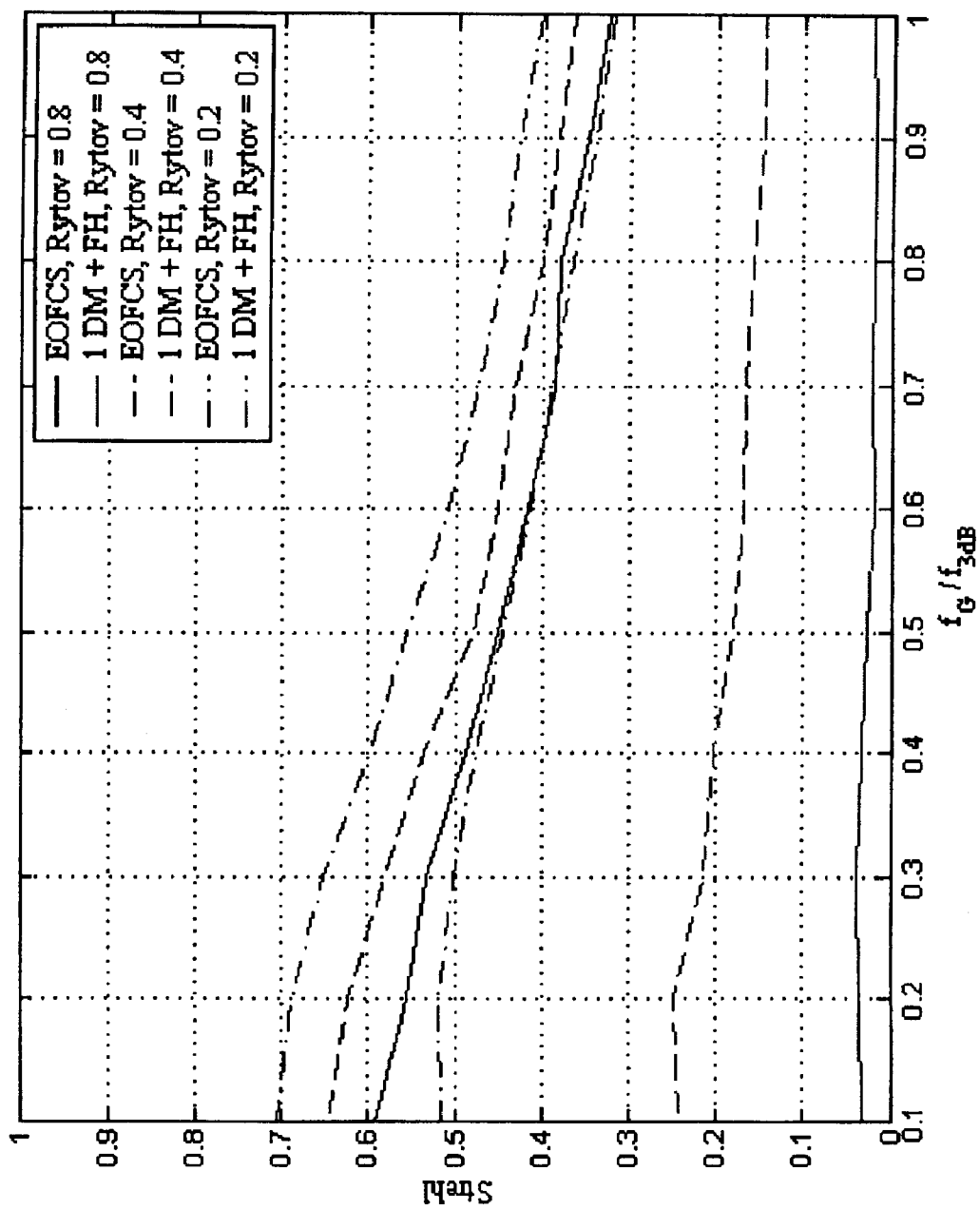
FIG. 6 presents the ensemble average performance of the EOFCS compared to a conventional AO system for several different values of the Rytov number.

In FIG. 6, the ensemble average performance of the EOFCS and a conventional AO system are plotted as a function of $f_G/f_{3dB}$ for Rytov numbers of 0.2, 0.4, and 0.8. Ensemble average indicates that the average Strehl was computed for frames 129 through 256 for four separate turbulence realizations in each condition. As expected, the performance of the EOFCS is only slightly better than that of a conventional AO system when the Rytov number is small (0.2). In addition, both systems experience an expected degradation with $f_G/f_{3dB}$. The performance of the EOFCS is significantly better than that of conventional AO systems in the most stressing (strong scintillation) conditions.

The performance results shown in this section are consistent with those previously given for the case of an infinite bandwidth. This is due to the fact that the closed loop algorithm presented here is actually another version of the previously developed open loop iterative algorithms. The primary difference is that the closed loop algorithm relies on feedback to converge towards the open loop solution (in much the same manner as in traditional linear control systems).

6. Some Alternate Configurations

The ideal configuration has two practical limitations that may limit its utility. The first is that for an energy projection application, if the outgoing laser beam is not coherent with the input wavefront sensing beam, then the arrangement described in Section 5 can not be used to obtain the phase error between the two beams. The second limitation is that the ideal configuration relies on the technology associated with a self-referencing, point diffraction interferometer, which may be difficult to use practically if the source is not both spatially and temporally coherent.

For the case of the first limitation, if both the outgoing laser beam and the input sensing beam are temporally coherent point sources (but with spatial aberrations due to aberrations in the laser cavity or aberrations induced by propagation through a turbulent medium, respectively), then the best approach would be to simply sense the phase of the incoming and outgoing beams at the planes of the two phase correction devices using a point diffraction interferometer. Then, these phase measurements can be used to obtain an approximation of the phase error between the two beams. This approach requires the use of four sensing arrays, which increases the system complexity. Furthermore, this approach still requires the generation of a local reference for both the incoming and outgoing beams. Thus, it is necessary for this approach that each beam originates as a point source, and ideally (so that optical amplification of the reference is possible) the beams should be temporally coherent.

When the beams are not temporally coherent, or if the sensing beam is spatially extended and also spatially incoherent, then a point diffraction interferometer will likely not be suitable for making phase measurements due to the difficulties in generating a local reference when using incoherent sources. In this case, again four sensing measurements must be made, however, rather than making these measurements using a point diffraction interferometer, more conventional techniques, better suited to incoherent sources, should be used. Two obvious options are a Hartmann sensor coupled with a wavefront reconstruction algorithm or a shearing interferometer coupled with a wavefront reconstruction algorithm. In either case, the wavefront reconstruction algorithm should be able to accommodate the presence of branch points in the phase function. This is necessary due to the fact that when the turbulence is severe enough to warrant the use of two deformable mirrors, branch points in the phase function become a large contribution to the phase error. An additional point is that if a gradient-based sensor (for example a Hartmann sensor or shearing interferometer) is used, then it is not necessary to reconstruct the phase from the gradients on each of the four beams. Rather, it is more efficient to simply compute the error in the gradients between the incoming and outgoing beam at each correction plane and then perform the reconstruction.

Any other wavefront sensing approach that obtains an estimate of the phase difference between the incoming and outgoing beams at the planes of each phase correction device is suitable. The choice of wavefront sensing approach is dependent on the application. In those cases when the ideal configuration can not be used, then a careful study should be carried out prior to committing to any one approach.

There are advantages offered by the ideal implementation of the EOFCS, other than the fact that only two wavefront-sensing measurements are required. All of the high spatial frequency diffraction effects will be captured in the phase error measurements obtained by the ideal configuration. In the ideal configuration, the measurements obtained at the plane of each phase correction device are of the form, $$\varepsilon = \arg\left\{\int_r d\vec{r} U_2^*(\vec{r}) U_1(\vec{r})\right\} \quad (9)$$

where r describes the spatial extent of the subaperture. However the phase error measurements obtained from separate measurement of each beam are of the form, $$\varepsilon = \arg\left\{\int_r d\vec{r}_2 U_2^*(\vec{r}_2) \int_r d\vec{r}_1 U_1(\vec{r}_1)\right\}. \quad (10)$$

These two measurements are similar, however, the first measurement is directly related to the performance of the system while the second is only an approximation of the system performance. It is possible to have a very small value for the second measurement, but if there is significant high spatial frequency content (as is often the case due to diffraction), then the associated value for the first measurement could be quite large, leading to poor performance.

Figure 7:
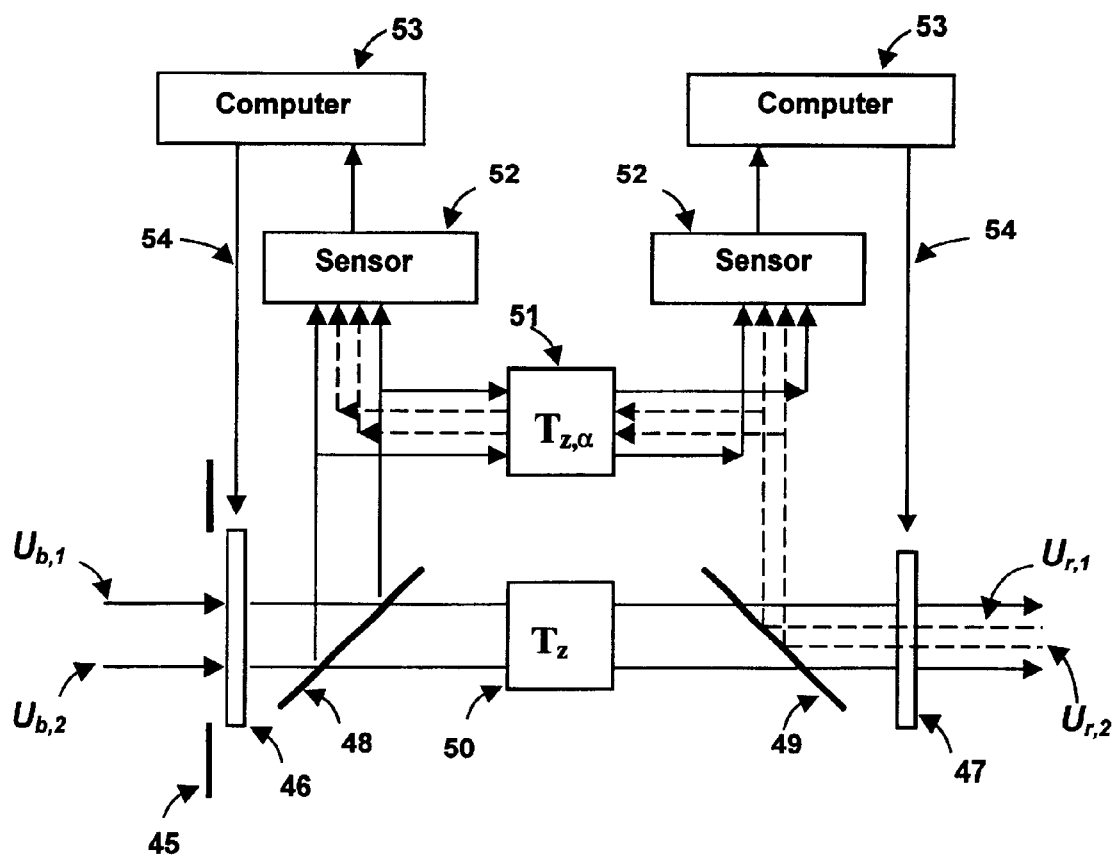
FIG. 7 depicts a generic framework for the Wide Field of View Electro-Optical Field Conjugation System (WFOV EOFCS).

The first method is illustrated in FIG. 7. For ease of illustration, only two incoming wavefront sensing beacons are shown. The beacons pass through the telescope aperture 45, whereupon corrections are applied by the first 46 and second 47 phase correction devices. Relay optics 50 are used to adjust the conjugate plane of the second phase correction device. Beamsplitters, 48 and 49, are used to obtain samples of the reference and input beams. The input beams are spatially filtered and relayed to the plane of the second phase correction device by the spatial filter and propagation operator 51. The reference beams are spatially filtered and relayed to the plane of the first phase correction device. Four measurements are obtained: the average (over the beacons) of the phase of the input beam in the planes of the two phase-correction devices and the average (over the references) of the phase of the input beam in the planes of the two phase correction devices. These measurements are made by the sensors 52. A digital computer 53 is used to compute the phase difference between the input and reference beams and determine mirror commands 54 to be applied to the phase correction devices.

If this first method is to be used, then the beams do not need to be optically isolated, thus they can all have the same wavelength. However, the beams must not interfere with one another. Assuming the laser sources have been selected so that the beams do not interfere with one another, the average over the beams of the phase on the incoming and outgoing beams can be measured by any single wavefront-sensing device. Again, the average phase on the incoming and outgoing beams must be measured at the plane of each phase-correction device. Although a self-referencing, point diffraction interferometer will likely be the preferred method for sensing (sensing the beams simultaneously will result in forming an estimate of the complex field of each set of beams at each correction plane), other gradient based sensors may be used as well. As is the case for the nominal EOFCS, if a gradient based sensor is used then the difference in average gradients between the incoming and outgoing beams should be sensed and reconstructed, rather than reconstructing the average phase on each of the four sets of beams.

Figure 8:
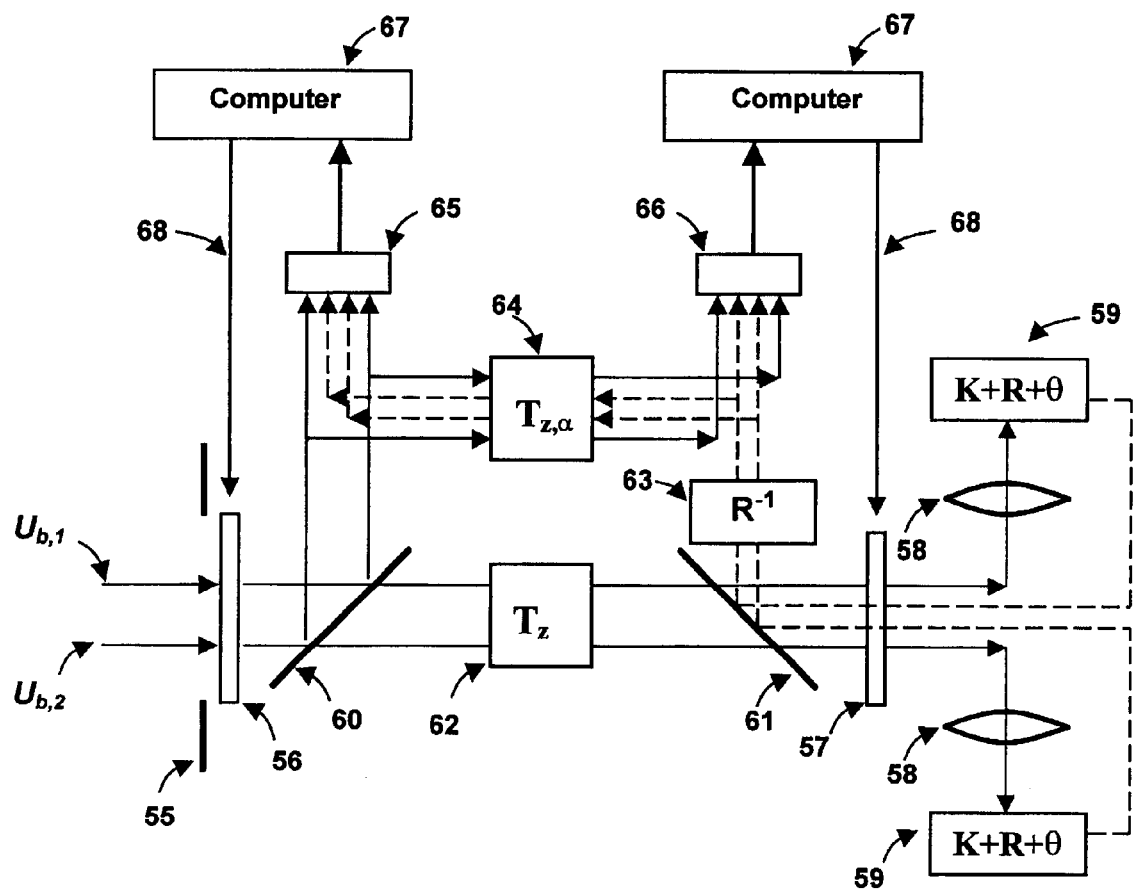
FIG. 8 is a configuration schematic for one version of the WFOV EOFCS.

The second method is illustrated in FIG. 8. Again only two input beacon beams are shown for clarity. The input beams pass through the telescope aperture 55 and are corrected by the phase correction devices, 56 and 57. Relay optics 62 are used to control the conjugate plane of the second phase correction device. At this point the beams must be chromatically isolated in order to focus 58 each beam, and then spatially filter, apply a phase shift, and rotate the polarization via the operator represented in 59. This procedure generates a controlled reference associated with each incoming beam that can be interfered with the appropriate input beam. Again, beamsplitters, 60 and 61, are used to obtain samples of the beams for wavefront sensing. As in the case of the EOFCS, the polarization of the reference beam must be rotated back 63 and the input and reference beams are relayed between the planes of the phase correction devices via the spatial filter and propagation operator 64. Also as in the case of the EOFCS, interference patterns of the input and reference beams are measured using a CCD array 65, 66 in the plane of each phase correction device. These interference patterns are used to obtain a measurement of the phase error in each of the two conjugate planes of the phase correction devices. A digital computer 67 is used to compute the control commands 68 to be applied to the two phase-correction devices.

If this second method is selected, then to generate a local reference for each beam it is necessary to optically isolate the wavefront sensing beacons from one another. It is likely that chromatic isolation will be required (recall that polarization switching is used to optically isolate the incoming and outgoing beams). By using different wavelength beacons, it is possible to generate a local reference outgoing beam associated with each incoming beam. The input and reference beams in FIG. 3 simply become a collection of beams. The incoming beams and outgoing beams interfere and an estimate of the phase difference between the incoming and outgoing beams, averaged over the multiple beams, is available. The problem that is expected with this approach is that, with current technology, it is difficult to make the beams optically separable, but still close enough in wavelength that chromatic anisoplanatism does not significantly effect the performance of the system. Despite the current limitations imposed by technology, it is expected that these limitations will be avoidable in the future. Perhaps optical isolation of the spatially filtered beams will prove to be easier. Assuming that a reference beam associated with each sensing direction can be maintained, the incoming and reference beams can all be combined on the same detector array because each beam will only interfere with its local reference, and not with the other beams. Thus the measurement obtained is the average over the beams of the differential phasor between the incoming and outgoing beams which is exactly the error signal required for a wide field of view closed loop MCAO system.

Although the first approach requires more measurements (four), it may actually be superior because it does not suffer from chromatic anisoplanatism. This will have to be ascertained via simulation for the specific implementation of interest.

In either case, all of the implementation issues discussed for the nominal EOFCS are still pertinent, including the temporal filtering and unwrapping of the phase commands and the discussion on coherence length requirements. The one implementation issue specific to the WFOV EOFCS is the conjugate altitude of the second phase correction device. For the EOFCS it was found that good on-axis performance can be obtained regardless of whether the second phase correction device is conjugate to some upper altitude turbulence or is simply conjugate to some range behind the telescope. However, for the WFOV EOFCS it is necessary to place the second phase correction device conjugate to some upper altitude turbulence in order to obtain significant improvement over a wide field of view. Generally, the optimal range corresponds to the strongest upper altitude turbulence layer if one wishes to maximize the compensated field of view.

There may also be a clever implementation to utilize very long coherence length lasers in the WFOV EOFCS. However, the WFOV EOFCS is relying on using short enough coherence length lasers that the set of incoming beams do not interfere with one another thus allowing the combination of the measurements on a minimum number of detectors. Although a short coherence is desirable, the coherence length must be long enough to ease optical alignment tolerances for interferometric measurements and even longer if one wishes to use point diffraction interferometers, particularly if one wishes to optically amplify the local reference.

Although no simulations of the WFOV EOFCS have been performed, it is expected that performance will be consistent with that reported for the case of open loop control of two phase correction devices for increasing the compensated field of view. This result is expected due to the fact that the performance of the on-axis EOFCS system is consistent with previously reported results for the open loop control of two phase correction devices for scintillation compensation.

Appendix A

The EOFCS obtains good performance because of the fact that it is approximately equivalent to the open loop iterative algorithms that have been successfully employed in the past. A brief derivation of the simplest form of the iterative algorithm and the modifications associated with the EOFCS are shown here. The derivation begins by noting that the Strehl ratio is proportional to the inner product, $$S \propto <U_b e^{i\phi}, T_z^*[U_r e^{i\phi_2}]>. \quad (A.1)$$

Manipulate (A.1) to obtain $$S \propto <e^{i\phi_1}, U_b^* T_z^*[U_r e^{i\phi_2}]>. \quad (A.2)$$

Holding $\phi_2$ constant, the following is the optimal solution for $\phi_1$, $$\phi_1 = \arg\{U_b^* T_z^*[U_r e^{i\phi_2}]\}. \quad (A.3)$$

Similarly, holding $\phi_1$ constant, the following is obtained by manipulating (A.1), $$\phi_2 = \arg\{U_r^* T_z[U_b e^{i\phi_1}]\}. \quad (A.4)$$

By iteratively computing new values for $\phi_1$ and $\phi_2$, the Strehl ratio is monotonically increased. This is the principle on which the iterative algorithms determine mirror commands to maximize the Strehl ratio.

The EOFCS has a slightly different implementation but the principle is similar. Let $\epsilon_1$ and $\epsilon_2$ be the error signals associated with each measurement plane. These are given by, $$\epsilon_1 = \arg\{e^{-i\phi_1} U_b^* T_z^*[U_r e^{i\phi_2}]\} \quad (A.5)$$

$$\epsilon_2 = \arg\{e^{-i\phi_2} U_r^* T_z[U_b e^{i\phi_1}]\} \quad (A.6)$$

Letting the new value for $\phi_1$ and $\phi_2$ be given by $\phi_1 = \phi_1 + a \epsilon_1$ and $\phi_2 = \phi_2 + a \epsilon_2$ (in the exact manner as implemented by the EOFCS, but with a=1 for illustrative purposes here), it is clear that the EOFCS is nearly equivalent to the open loop iterative algorithms described and evaluated previously. There is one important point to note: the EOFCS is not equivalent with the proper initialization of the value for $\phi_1$ and $\phi_2$. The initial value for $\phi_1$ can be set to any arbitrary value. The initial value for $\phi_2$ must be set as $$\phi_2 = \arg\{U_r^* T_z[U_b e^{i\phi_2}]\}.$$

By use of this initialization, the EOFCS is equivalent to the open loop iterative algorithm.

This equivalence is only guaranteed if the system is perfectly understood. In fact, if the system is perfectly understood, then if implemented as above with a=1, then the EOFCS would be unstable without use of the proper initialization. However, the point of developing a closed loop architecture was to achieve robust to unknown or imprecisely known properties of the system, thus how is the above discussion applicable? The above discussion is applicable because it links the EOFCS to the well-understood iterative algorithms in an ideal situation. In a more realistic situation, the story is different. Simulation based explorations have shown that the EOFCS is stable with an arbitrary initialization if the value for a is set sufficiently less than 1 (a<0.75 appears to be satisfactory). Further, the EOFCS obtains more stability and performance robustness by the incorporation of the Gaussian spatial filters into the operator $T_z$.

The good performance of the EOFCS is explained because of the link to the open loop iterative algorithms that, by minimization of the error between the incoming and outgoing beams, lead to full wave conjugation. The stability and performance robustness of the EOFCS is found to be due to implementation with a reduced closed loop bandwidth (a<1) and by the use of spatial filtering in the optimization process.

What is claimed is:

1. In an adaptive optical system, a method for controlling two phase-correction devices to compensate for amplitude and phase fluctuations resulting from propagation through a turbulent medium, the method comprised of:

receiving an input beam at a telescope aperture;

correcting the input beam by a first phase correction device;

passing a portion of the input beam through a first beam splitter and through a second phase correction device that is conjugate to a finite range z, the balance of the input beam being directed to the plane of the second phase correction via an optical spatial filtering and propagation operator;

passing a reference beam through the second phase correction device and directing it to the plane of the first phase correction device via the optical spatial filtering and propagation operator;

measuring the phase difference between the input and reference beams at the planes of the two phase correction devices utilizing a total of four detectors; and independently commanding the first and second phase correction devices based on the measured phase difference between the input and reference beams.

2. In an adaptive optical system, a method for controlling two phase-correction devices to compensate for amplitude and phase fluctuations resulting from propagation through a turbulent medium, the method comprised of:

receiving a temporally coherent input beam at a telescope aperture;

correcting the input beam by a first phase correction device;

passing a portion of the input beam through a first beamsplitter, through a polarizing beamsplitter, and through a second phase correction device that is conjugate to a finite range z, whereupon the compensated input beam is subsequently focused, spatially filtered, expanded, shifted in phase, and polarized to be orthogonal to the polarization of the input beam thereby generating a reference beam that, with proper alignment of path lengths, is temporally coherent with the input beam;

propagating the reference beam back through the second phase correction device, reflecting it off the polarizing beamsplitter, and rotating the polarization to match the input beam;

propagating and spatially filtering via a relay optic the reference and input beams between conjugate planes of the first and second phase-correction devices to interfere the reference and input beams and measure the resultant interference pattern to obtain a measurement of the phase error at the plane of each phase correction device utilizing a total of two detectors; and independently commanding the first and second phase correction devices based on the phase error signal between the input and reference beams.

3. In an adaptive optical system, a method for controlling two phase-correction devices to increase the compensated field of view by means of compensation of amplitude and phase fluctuations resulting from propagation through a turbulent medium, the method comprised of:

receiving a set of input beams from multiple directions at a telescope aperture;

correcting the input beams by a first phase correction device;

passing a portion of the input beams through a first beam splitter and through a second phase correction device that is conjugate to a finite range z, the balance of the input beams being directed to the plane of the second phase correction via an optical spatial filtering and propagation operator;

passing a set of reference beams through the second phase correction device and directing it to the plane of the first phase correction device via the optical spatial filtering and propagation operator;

measuring the phase difference between the input and reference beams at the planes of the two phase correction devices utilizing a total of four detectors; and independently commanding the first and second phase correction devices based on the measured phase difference between the input and reference beams.

4. In an adaptive optical system, a method for controlling two phase-correction devices to increase the compensated field of view by means of compensation of amplitude and phase fluctuations resulting from propagation through a turbulent medium, the method comprised of:

receiving a set of input beams that are temporally coherent but not coherent with one another and at slightly different wavelengths from multiple directions at a telescope aperture;

correcting the input beams by a first phase correction device;

passing a portion of the input beams through a first beamsplitter, through a polarizing beamsplitter, and through a second phase correction device that is conjugate to a finite range z, whereupon the compensated input beams are subsequently focused, spatially filtered, isolated in wavelength, expanded, shifted in phase, polarized to be orthogonal to the polarization of the input beam and re-combined thereby generating a set of reference beams that, with proper alignment of path lengths, are temporally coherent with their respective input beams;

propagating the reference beams back through the second phase correction device, reflecting it off the polarizing beamsplitter, and rotating the polarization to match the input beams;

propagating and spatially filtering via a relay optic the reference and input beams between conjugate planes of the first and second phase-correction devices to interfere the reference and input beams and measure the resultant interference pattern to obtain a measurement of the phase error averaged over the multiple directions at the plane of each phase correction device utilizing a total of two detectors; and independently commanding the first and second phase correction devices based on the phase error signal between the input and reference beams.

* * * * *